United States Patent [19]
Osborne

[11] Patent Number: 5,590,981
[45] Date of Patent: Jan. 7, 1997

[54] DOUBLE-CONTAINMENT UNDERGROUND PIPING SYSTEM

[75] Inventor: Keith J. Osborne, Glen Ellyn, Ill.

[73] Assignee: Intelpro, Inc., Chicago, Ill.

[21] Appl. No.: 469,652

[22] Filed: Jun. 6, 1995

Related U.S. Application Data

[63] Continuation of Ser. No. 286,893, Dec. 20, 1988.

[51] Int. Cl.⁶ ............................................. F16L 1/00
[52] U.S. Cl. ....................... 405/154; 405/52; 405/128; 588/259; 138/114; 138/111
[58] Field of Search ............................ 405/154, 128, 405/52; 588/259; 138/111–114, 121, 140, 141; 73/40.5 R

[56] References Cited

U.S. PATENT DOCUMENTS 3,974,862  8/1976  Fuhrmann ........................ 138/114 X
4,932,257  6/1990  Webb .............................. 73/40.5 R

*Primary Examiner*—Dennis L. Taylor
*Attorney, Agent, or Firm*—Lockwood, Alex, Fitzgibbon & Cummings

[57] ABSTRACT

A coaxial piping system connected between an underground pump and an above-ground liquid dispenser is used to provide containment of the pumped liquid from the underground piping system, preventing unintended release into the environment. A pair of coaxial pipes are removably connected to the underground pump at one end and to the dispenser at the other end using quick-disconnect fittings to allow for the replacement of the piping. A primary pipe for conveying gasoline or the like is surrounded by a secondary pipe, which provides containment in the event of leakage from the primary pipe. The piping system can be tested for leaks or replaced from grade without excavating at the installed tank site. A sensor in the annular space between the primary and secondary pipes may be used to detect leakage. A path may be provided for the gravity drainage of such leaks from the secondary pipe into a containment chamber, where the liquid may be detected and removed.

8 Claims, 5 Drawing Sheets

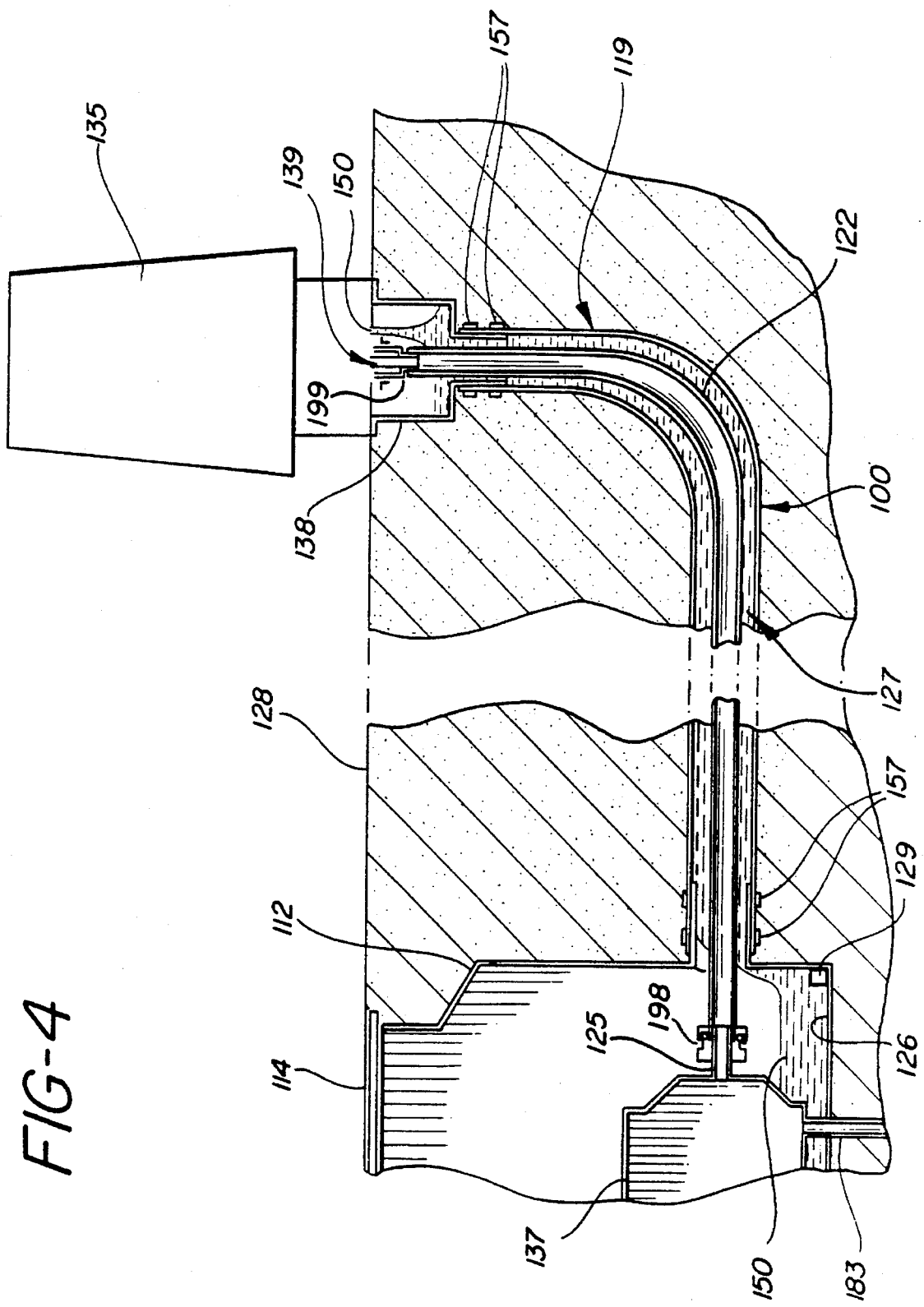

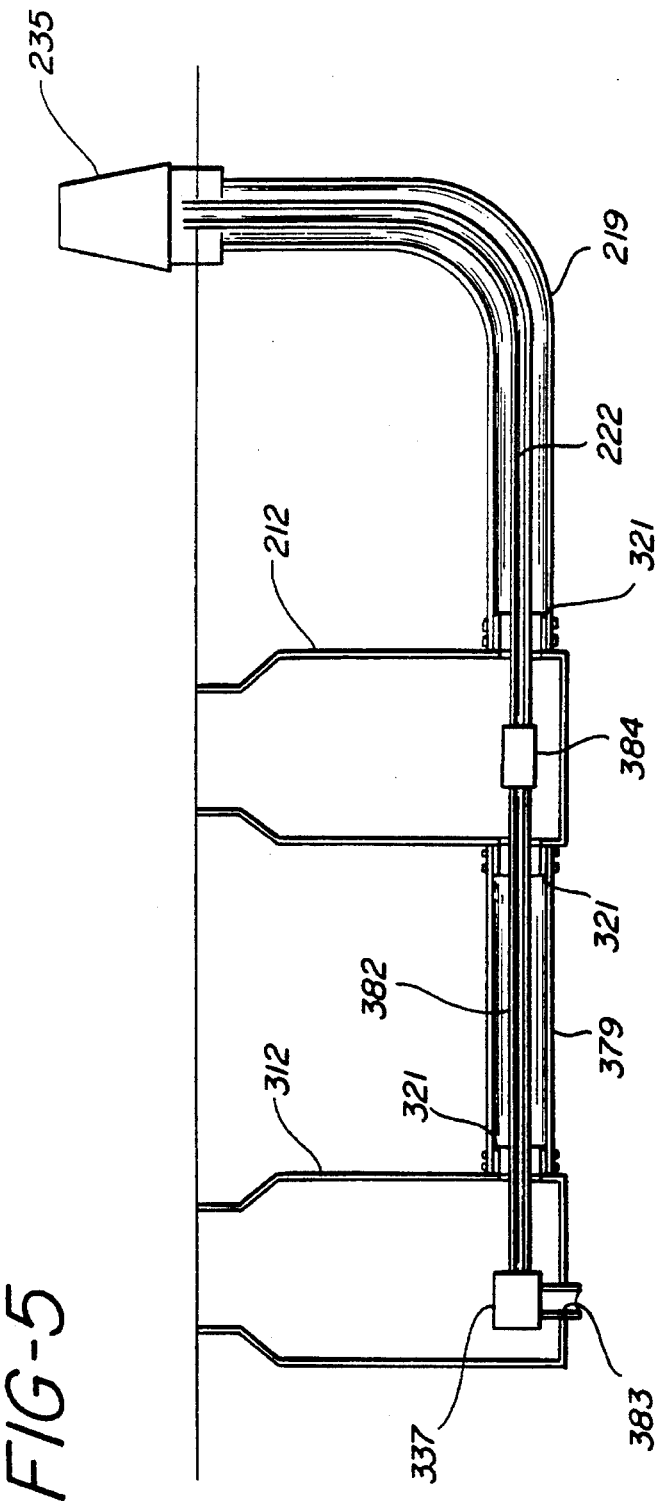
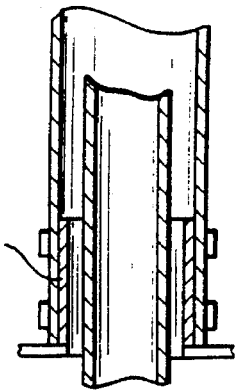
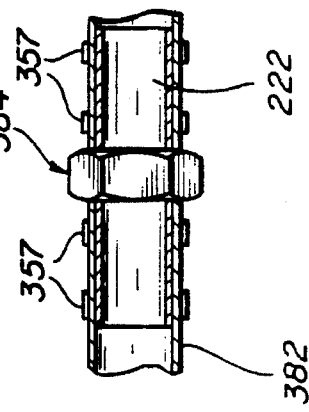

DOUBLE-CONTAINMENT UNDERGROUND PIPING SYSTEM

This application is a continuation of application Ser. No. 07/286,893, filed Dec. 20, 1988.

FIELD OF THE INVENTION

The present invention relates to an improved underground piping system for underground tanks used to store hydrocarbon fuels or the like.

BACKGROUND OF THE INVENTION

Studies by the United States Environmental Protection Agency have found that approximately two-thirds of the leaks in underground storage tanks can be traced to failure of an underground piping system rather than to the tank itself. Specific locations include joints such as unions, elbows and couplings where two straight pieces of pipe are joined together, connections to underground equipment, and corroded steel pipes.

Also, structural failure in piping systems can occur when movements take place in tanks and/or piping systems due to to high water tables or settling ground movement. This is particularly true in the case of rigid fiberglass piping systems which are subject to cracking or outright structural failure.

SUMMARY OF THE INVENTION

The present invention provides a piping system for conveying fluid from the outlet port of a pump to the inlet port of a fluid dispenser. The system comprises a primary pipe of flexible material having an inlet end and an outlet end, a secondary pipe of flexible material generally surrounding the primary pipe, a pump coupling removably coupled to the outlet port of the pump, a dispenser coupling removably coupled to the inlet port of the fluid dispenser, and two secondary couplings. A secondary pump coupling removably secures the pump end of the secondary pipe to an outer piping adapter of the pump coupling. A secondary dispenser coupling removably secures the dispenser end of the secondary pipe to an outer piping adapter of the dispenser coupling.

The pump coupling comprises an inner pipe in communication with the outlet port of the pump and an outer piping adapter concentric with the inner pipe. The dispenser coupling comprises an inner pipe in communication with the inlet port of the fluid dispenser and an outer piping adapter concentric with the inner pipe. The inlet end of the primary pipe is removably secured to the inner pipe of the pump coupling, and the outlet end of the pipe is removably secured to the inner pipe of the dispenser coupling.

The secondary couplings comprise a first male coupling adapted to mate with the pump end of the secondary pipe and a second male coupling adapted to mate with the dispenser end of the secondary pipe.

In accordance with the present invention, the annular volume defined by the primary pipe, the secondary pipe, the pump-body coupling, secondary pump coupling, the dispenser coupling and the secondary dispenser coupling provides containment for the fluid in the event of leakage from the primary pipe.

It is an object of the present invention to prevent or decrease the inadvertent leakage of hazardous liquid such as hydrocarbon fuel into the environment from an underground storage tank piping system.

The present invention provides a double-walled flexible piping system especially suitable for underground tanks used to store hydrocarbon fuels.

Another advantage is that the piping can be replaced without excavating or breaking ground at the installed tank site.

An additional advantage is that piping is readily accessible from grade for structural testing without excavating or breaking ground at the installed tank site.

It is a feature of the present invention that in the event of a leak of the piping the leak and virtually totally contained within the annular space between the primary and secondary pipe or in the pipe containment chamber and not discharged to the surroundings.

An additional feature of a preferred embodiment of the present invention is that a sensor placed between the walls of the two concentric pipes provides a method of detecting any release from the primary pipe, e.g. causing an alarm to sound.

An additional feature of a preferred embodiment is that any leakage from the primary pipe into the annular space between the primary and secondary pipes can be drained into a containment chamber, where it can be removed without contaminating the environment.

An additional feature of an alternative embodiment is that any leakage into the annular space between the primary and secondary pipe can be removed by suction at the dispenser connection above ground, where it can be removed without contaminating the environment.

BRIEF DESCRIPTION OF THE DRAWINGS

FIG. 4 is an elevational cross-section of a portion of the piping system of FIG. 1 showing in greater detail the connection of the flexible pipe with the fuel dispenser. FIG. 4 shows an alternate embodiment of the embodiment of the invention shown in FIGS. 1 to 3.

FIG. 5 is a schematic elevational cross-section of the flexible piping run/manifold connection to other underground storage tank systems. FIG. 5 shows another alternate embodiment of the invention shown in FIGS. 1 to 3 connecting a plurality of underground storage tank systems.

FIGS. 6 and 7 are each elevational views in cross-section showing in greater detail certain elements depicted schematically in FIG. 5.

DETAILED DESCRIPTION

Figure 1:
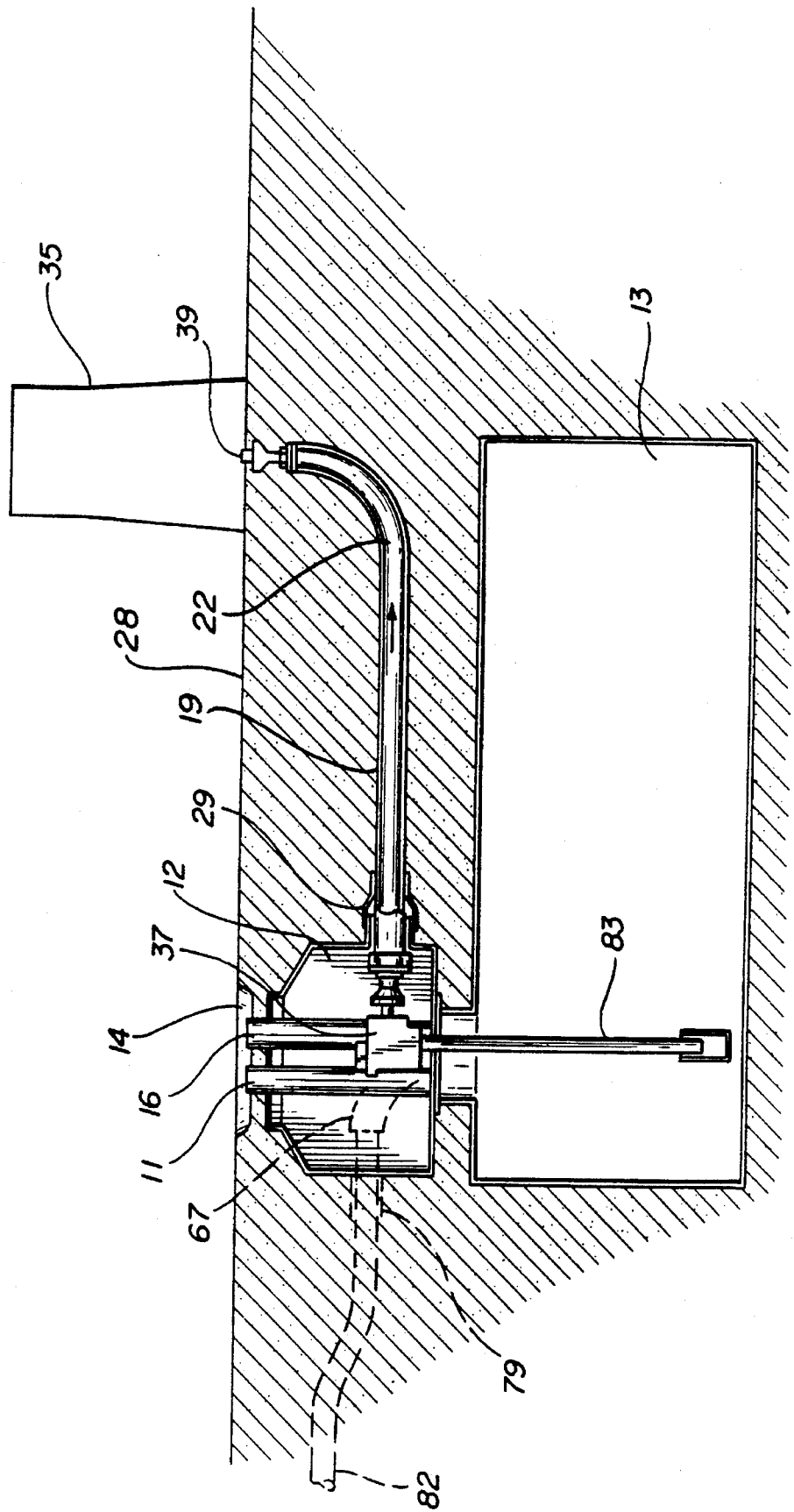
FIG. 1 is an elevational cross-section of an installed underground fuel storage tank provided with a piping system in accordance with the present invention.

FIG. 1 shows a conventional underground fuel tank 13 with a single manway 14 at grade level 28, equipped with a conventional containment chamber 12, which provides access to the pump 37 and the underground piping 19, 22 connected to it. The underground tank 13 is filled with fuel by opening the manway 14 and transferring fuel to tank 13 through the fill pipe 16.

A pump 37 is provided to pump fuel from the underground tank 13 through a primary pipe 22 to a fuel dispenser coupling 39 providing input to a fuel dispenser 35. The fuel dispenser 35 may be a conventional service station gas pump. In accordance with the present invention, a secondary pipe 19 jackets the primary pipe 22 and provides containment for any fuel that might leak out of primary pipe 22.

To enter the containment chamber 12, one removes the manway cover 14, exposing the vapor recovery pipe 11 and the fill pipe 16, which can then be removed from grade level 28.

Figure 2:
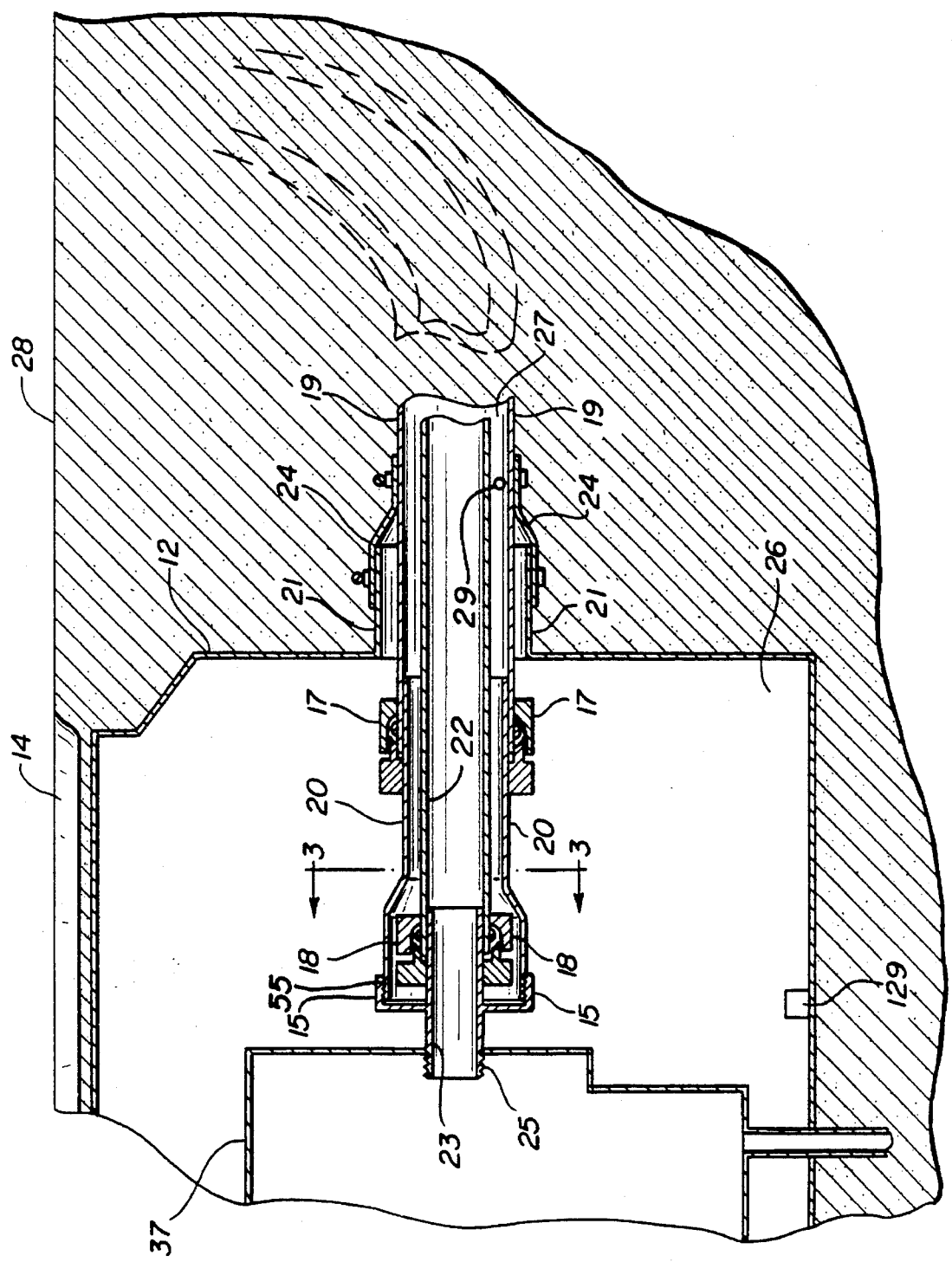
FIG. 2 is an elevational cross-section of a portion of the piping system of FIG. 1 showing in greater detail the connection of the flexible pipe with the pump body.
Figure 3:
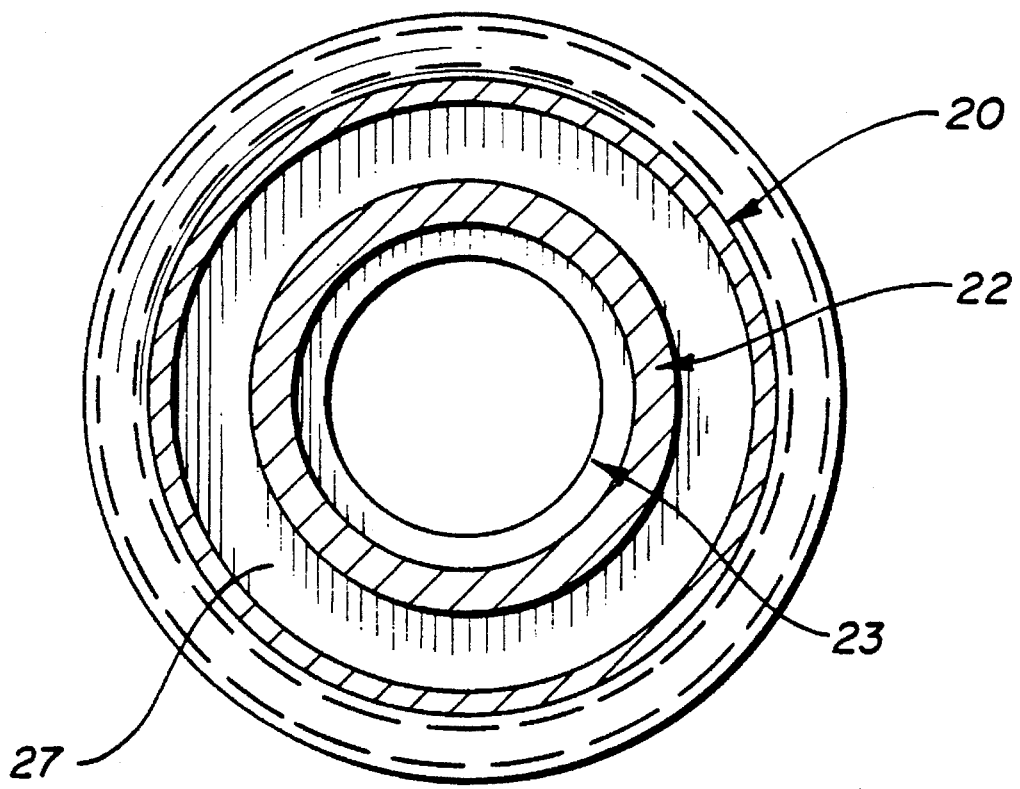
FIG. 3 is a cross-section taken along the line 3—3 of FIG. 2.

As shown in FIG. 2, the compression fittings 17, 18 for the secondary pipe 19 and the primary pipe 22 are now accessible from the containment chamber 12. The compression fitting 17 for the secondary pipe 19 is disconnected. The male-threaded coupling 20 is next unscrewed from the female-tapped outer piping adaptor 15, and the male coupling 20 is forced away from the pump and outer piping adaptor, thereby exposing the compression fitting 18 connecting the primary pipe 22 with an inner pipe 23. The compression fitting 18 can now be disconnected, thus disconnecting the primary pipe 22 and the secondary pipe 19 from the inner pipe 23 and the pump 37. The other ends of the primary pipe 22 and secondary pipe 19 are similarly disconnected from the dispenser at or about grade level 28.

The primary pipe 22 can now be "fished" or pulled up and out from the outer secondary pipe 19 from grade level. The primary pipe 22 and the secondary pipe 19 are accessible at both ends—below grade at the interface with the containment chamber, and at or about grade level at the interface with the fuel dispenser. Since the pipes 19, 22 are flexible, the pipe may be shipped to the field site where the tank is installed and cut at the job site to the desired length.

The inner pipe 23 is a forged or cast custom fitting comprising 2-inch outside diameter inner pipe connected to an outlet port of pump 37, below ground. The dispenser coupling 39 has a corresponding fitting connected to the dispenser inlet port. The flexible primary pipe 22, desirably of 2-inch inner diameter, fits over the inner pipe 23. The compression fitting 18 clamps and firmly secures the primary pipe 22 to the inner pipe 23. The length of the inner pipe 23 is typically two pipe diameters. The compression fitting 18 may be substituted with a common hose clamp, strap or other fitting.

The male coupling 20 is a 4-inch outside diameter steel pipe adapter with external threads. It screws at one threaded end 55 into the outer piping adaptor 15. The flexible secondary pipe 19 is desirably of 4-inch inside diameter hose piping. It slides over the free end of the male coupling 20. A compression fitting 17 clamps and firmly secures the secondary pipe 19 to the male coupling 20.

After installation of the flexible piping system, the secondary pipe 19 is rendered inflexible as it is buried in the ground. The secondary pipe 19 serves as a guide for the primary pipe 22 which slides into or is retractable from it.

The inner pipe 23 has a male thread 25 that screws into the outlet port of pump 37. (In some cases where the pump has a standard male connection, a standared pipe coupling may be necessary to connect the inner pipe.) Once the inner pipe 23 is screwed into the outlet port of the pump 37, the inner pipe 23 is fixed and is generally not removed.

A boot 24 is used to seal the entry of the secondary pipe, 19, where it enters the containment chamber 12 by being sealed to a sleeve 21 which is an integral part of the containment chamber 12.

If the primary pipe 22 leaks, the leakage is contained inside the outer pipe 19, and will not escape into and flood the containment chamber 11. If a leak arises at the juncture of the inner pipe 23 and pump 37, or at either of the two compression fittings 17 or 18, the presence of boot 24 ensures that the leak is contained in the piping containment chamber 12 at 26 and does not overflow into the surrounding soil. The boot 24 also prevents leakage from the fill pipe 16 from escaping from the containment chamber 12 into the soil.

The annular space between the coaxial primary pipe 22 and secondary pipe 19 can be tested for leakage in the primary pipe 22 by locating one or more sensors 29 in the annular space 27 between the pipes 22 and 19.

Installation Method

First, the flexible secondary pipe 19 is installed below the ground, and then the flexible primary pipe 22 is inserted from the grade level 28 into the previously installed secondary pipe 19. The below-ground ends of the two concentric pipes 19, 22 are mechanically connected inside the containment chamber 12, which is made accessible by removal of manhole cover 14. The above-ground ends of the two concentric pipes 19, 22 are mechanically connected inside the containment pan below the fuel dispenser 35.

Accordingly there are only two locations where there are mechanical fittings in the piping run—the connection at the containment chamber 12, and the connection at the containment pan 138. In accordance with the present invention, these mechanical piping connections at which the underground pipe is likely to leak and which cannot be inspected visually from above ground are the only ones. This must be compared with prior art piping systems wherein many underground connections are employed, and which are buried and inaccessible. To reach these connections it is necessary to excavate much of the piping system in order to find a leak. Furthermore, in the event of a leak at the connection 18 between the primary pipe 22 and the inner pipe 23, coupling 18 may be snapped open and the primary pipe 22 may be replaced with a new pipe underground without disturbing the concrete slab at grade level 28. So the underground piping is replaceable from grade 28 and without requiring excavation.

In FIG. 2, containment of the liquid, in the event of a leak in the primary pipe 22, will be held in the secondary pipe 19, which serves a containment function.

FIG. 4 schematically illustrates a similar gas dispensing station with an alternate embodiment for securing the primary and secondary pipes to the pump at one end and the dispenser at the other end in an under ground storage tank—dispenser piping system. In FIG. 4, a leak from the primary pipe 122, which carries the product, will flow into the secondary pipe 119, which provides containment of the leak, from which it will drain by gravity to 126 in the leak containment chamber 112. The coupling 199 secures the primary pipe 122 to the bottom of the shear valve 139 at the base of the dispenser 135. This coupling 199 is substantially similar to the coupling 198 at the other end of the double piping system in the containment chamber 112. Coupling 198 and 199 may be compression fittings similar to the compression fitting 18 shown in FIG. 2. The secondary pipe 119 is connected directly to sleeves that protrude from the containment pan 138 at one end and the containment chamber 112 at the other end. The method of connection may be stainless steel straps or bands 157, applied in the field with a strap tightening tool. Alternatively, a compression fitting may be used. Access to the containment chamber 112 is provided through the manway 114.

In either of the embodiments illustrated in FIG. 2 or 4, monitoring systems are installed at the containment chamber 26, or 126 and necessary repairs can be performed without a "release" to the environment. Such monitoring systems may, for example, include one or more liquid sensors 129 at the bottom of the containment chamber 26, 126 connected to a conventional alarm system (not shown). In both the described embodiments, the primary pipe 22 or 122 can be replaced from above ground.

The material of the primary pipe 22 or 122, and the secondary pipe 19 or 119 in the two depicted embodiments is similar to the conventional 'hose' construction, i.e. reinforced rubber or plastic material suitable for gasoline service.

A gasoline delivery hose—while having a short life-span above ground—will exhibit a substantially longer life when used below ground in darkness (i.e. out of bright sunlight) and in a stationary condition, as illustrated in FIGS. 1, 2 & 4. In such use there will be no: degradation of pipe material due to exposure to sunlight; deterioration of pipe material due to wear and tear which accompanies the frequent movement of the pipes as is now the case with conventional above-ground piping systems. Under such circumstances, the life expectancy of the underground piping system shown in FIG. 1, 2 or 4 will exceed 10 years instead of the approximately 4-year average life expectancy of conventional above-ground pipe systems.

Furthermore, in the event of very long runs of pipe between the fuel storage tank and the fuel dispenser, a repeater containment chamber 212 may be placed in the pipe run. The piping containment chamber 312, the primary and secondary piping system 222 and 219, the repeater containment chamber 212 and the fuel dispenser 235 are schematically shown in FIG. 5. The use of repeater containment chambers will be necessary in cases where the length of the primary and secondary piping system delivered to the jobsite is less than the distance between the piping containment chamber 312 and the fuel dispenser 235, or if multiple fuel storage tanks are utilized and interconnectors in the piping becomes necessary. The primary and secondary pipes may consist of a plurality of pipe segments, each respective segment connected to one another so as to form a continuous primary pipe, or a continuous secondary pipe.

As shown in FIG. 5, a pump 337 having an input pipe 383 extending downwardly towards the bottom of storage tank (not shown) is within an underground containment 312. A primary pipe 382 runs from containment 312 towards a dispenser 235. However, the pipe is not long enough to run all the way to dispenser 235 and instead terminates at an in-line coupling 384. The in-line coupling 384 communicates with the primary pipe 382 on the one side and with another primary pipe 222 on the other side, joining them to form a continuous passage for fluid. Clamps 357 secure pipes 382 and 222 to the coupling 384. Any leakage from either of the joints between the in-line coupling and pipe 382 or pipe 222 is contained within containment chamber 212.

If pipe 382 should leak and need to be replaced, it can be accomplished without having to replace the entire piping between the pump 337 and the dispenser 235, and correspondingly so for pipe 222.

It is apparent that the objects of the invention are fulfilled by the foregoing disclosure. It is to be understood, however, that many modifications may be made to the basic invention, some of which have been mentioned above. These and other modifications are to be deemed within the spirit and scope of the above-disclosed invention, which should be interpreted with reference to the following claims.

Having thus described the invention, what I desire to protect by Letters Patent and hereby claim is:

1. A secondarily contained piping system comprising:
   (a) a flexible inner supply pipe;
   (b) an outer secondary containment pipe;
   (c) a first underground access chamber;
   (d) a second underground access chamber spaced from the first underground access chamber;
   (e) said flexible inner supply pipe positioned to provide a path of fluid communication between said first underground access chamber and said second underground access chamber;
   (f) said flexible inner supply pipe having an exterior surface;
   (g) said flexible inner supply pipe further having a first end and a second end;
   (h) said secondary containment pipe surrounding at least a portion of the exterior surface of said inner supply pipe;
   (i) a fluid source connected at the first end of the flexible inner supply pipe;
   (j) a fluid outlet connected at the second end of the flexible inner supply pipe;
   (k) a first coupling connecting the flexible inner supply pipe to the fluid source, the first coupling being disposed within the first underground access chamber; and
   (l) a second coupling connecting the flexible inner supply pipe to the fluid outlet, the second coupling being disposed within the second underground access chamber.

2. A secondarily contained fluid distribution system for supplying fuel to at least one fuel dispenser comprising:
   (a) a fuel dispensing unit;
   (b) a flexible inner fuel supply pipe;
   (c) an underground outer secondary containment pipe;
   (d) first and second access chambers, said first access chamber being associated with said fuel dispensing unit, said second access chamber being spaced from the first access chamber;
   (e) said flexible inner fuel supply pipe positioned to provide a path of fluid communication between said first and said second access chambers;
   (f) said flexible inner fuel supply pipe having an exterior surface;
   (g) said flexible inner fuel supply pipe further having a first end and a second end;
   (h) said secondary containment pipe surrounding at least a portion of the exterior surface of said inner supply pipe;
   (i) a fuel source connector at the first end of the flexible inner fuel supply pipe;
   (j) a fluid outlet at the second end of the flexible inner fuel supply pipe which is connected to said fuel dispensing unit;
   (k) a first coupling connecting the flexible inner fuel supply pipe to the fuel source connector, the first coupling being disposed within the first spaced access chamber; and
   (l) a second coupling connecting the flexible inner fuel supply pipe to the fluid outlet, the second coupling being disposed within the second spaced access chamber.

3. The secondarily contained piping system as defined in claim 1 further comprising:

a first fitting associated with the first coupling, the first fitting being disposed within the first access chamber; and a second fitting associated with the second coupling, the second fitting being disposed within the second access chamber.

4. The secondarily contained piping system as defined in claim 1 wherein the flexible inner supply pipe is segmented and wherein the piping system further comprises:

a plurality of intermediate couplings connecting segmented portions of the flexible inner supply pipe; and additional underground access chambers, as necessary, each of said intermediate couplings being disposed within one of the underground access chambers.

5. The secondarily contained piping system as defined in claim 4 further comprising a plurality of intermediate fittings, each intermediate fitting being disposed within one of the underground access chambers.

6. The secondarily contained fuel distribution system as defined in claim 2 further comprising:

a first fitting associated with the first coupling, the first fitting being disposed within the first access chamber; and a second fitting associated with the second coupling, the second fitting being disposed within the second access chamber.

7. The secondarily contained fuel distribution system as defined in claim 2 wherein the flexible inner fuel supply pipe is segmented and wherein the fuel distribution system further comprises:

a plurality of intermediate couplings connecting segmented portions of the flexible inner fuel supply pipe; and additional access chambers, as necessary, each of said intermediate couplings being disposed within one of the access chambers.

8. The secondarily contained fuel distribution system as defined in claim 7 further comprising a plurality of intermediate fittings, each intermediate fitting being disposed within one of the access chambers.

* * * * *

(12) EX PARTE REEXAMINATION CERTIFICATE (8174th)
United States Patent
Osborne

(10) Number: US 5,590,981 C1
(45) Certificate Issued: Apr. 26, 2011

(54) DOUBLE-CONTAINMENT UNDERGROUND PIPING SYSTEM

(75) Inventor: Keith J. Osborne, Glen Ellyn, IL (US)

(73) Assignee: Pisces by OPW, Inc., Cincinnati, OH (US)

Reexamination Request:
No. 90/010,607, Sep. 8, 2009

Reexamination Certificate for:
Patent No.: 5,590,981
Issued: Jan. 7, 1997
Appl. No.: 08/469,652
Filed: Jun. 6, 1995

Related U.S. Application Data

(63) Continuation of application No. 07/286,893, filed on Dec. 20, 1988, now Pat. No. 5,553,971.

(51) Int. Cl.
F16L 39/00 (2006.01)
F16L 1/00 (2006.01)
F16L 1/028 (2006.01)
F16L 1/036 (2006.01)

(52) U.S. Cl. .................. 405/154.1; 405/52; 405/129.55; 138/111; 138/114; 588/259

(58) Field of Classification Search .................. None
See application file for complete search history.

(56) References Cited

U.S. PATENT DOCUMENTS

| 216,286 A | 6/1879 | Miller |
| 244,752 A | 7/1881 | Hunter et al. |
| 272,833 A | 2/1883 | Goodfellow |
| 286,938 A | 10/1883 | Martin |
| 291,715 A | 1/1884 | Geives et al. |
| 430,010 A | 6/1890 | Flad |
| 470,946 A | 3/1892 | Munsie |
| 648,128 A | 4/1900 | Kinniburgh |
| 745,351 A | 12/1903 | Hungerford |
| 997,434 A | 7/1911 | Barnes |
| 1,188,446 A | 6/1916 | Haines |
| 1,375,363 A | 4/1921 | Cary et al. |
| 1,986,789 A | 1/1935 | Bennett |
| 2,050,968 A | 8/1936 | Gottwald et al. |
| 2,093,114 A | 9/1937 | Sommenfeld |

(Continued)

FOREIGN PATENT DOCUMENTS

| EP | 0207015 A3 | 12/1986 |
| EP | 0207015 A2 | 12/1986 |
| GB | 1374874 | 11/1974 |
| GB | 1390280 | 4/1975 |
| GB | 2023296 | 12/1979 |

(Continued)

OTHER PUBLICATIONS

Environmental Protection Agency, Proposed Rules, 40 CFR Part 280, Underground Storage Tanks; Technical Requirements, Apr. 17, 1987, p. 1–286.

(Continued)

*Primary Examiner*—Patricia L Engle

(57) ABSTRACT

A coaxial piping system connected between an underground pump and an above-ground liquid dispenser is used to provide containment of the pumped liquid from the underground piping system, preventing unintended release into the environment. A pair of coaxial pipes are removably connected to the underground pump at one end and to the dispenser at the other end using quick-disconnect fittings to allow for the replacement of the piping. A primary pipe for conveying gasoline or the like is surrounded by a secondary pipe, which provides containment in the event of leakage from the primary pipe. The piping system can be tested for leaks or replaced from grade without excavating at the installed tank site. A sensor in the annular space between the primary and secondary pipes may be used to detect leakage. A path may be provided for the gravity drainage of such leaks from the secondary pipe into a containment chamber, where the liquid may be detected and removed.

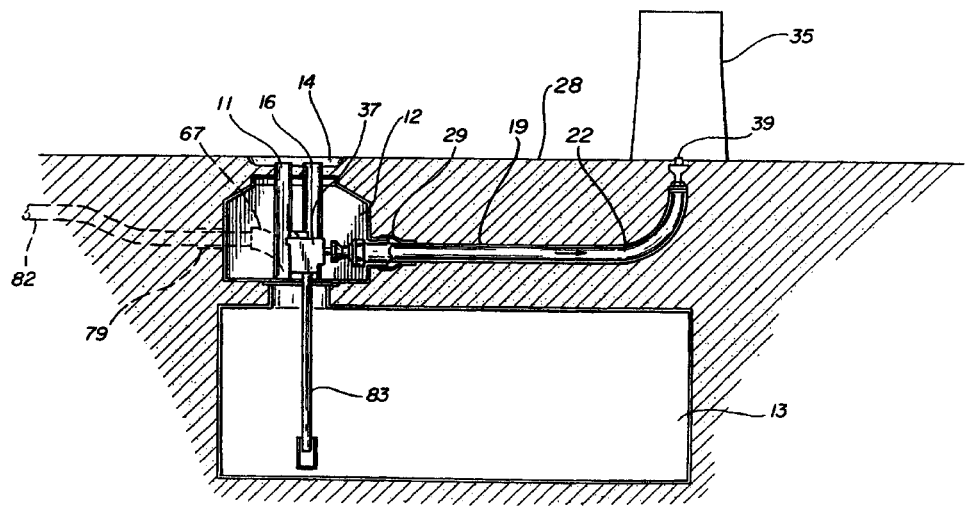

U.S. PATENT DOCUMENTS

| | | |
|---|---|---|
| 2,113,204 A | 4/1938 | Wasser |
| 2,129,924 A | 9/1938 | Galbraith |
| 2,268,263 A | 12/1941 | Newell et al. |
| 2,306,331 A | 12/1942 | Elmer |
| 2,325,565 A | 7/1943 | Williams |
| 2,336,150 A | 12/1943 | Horvath |
| 2,347,912 A | 5/1944 | Komives |
| 2,487,939 A | 11/1949 | Norton |
| 2,507,597 A | 5/1950 | Holdridge |
| 2,546,348 A | 3/1951 | Schuman |
| 2,956,586 A | 10/1960 | Zeigler et al. |
| 3,221,758 A | 12/1965 | Morse |
| 3,299,417 A | 1/1967 | Sibthorpe |
| 3,379,027 A | 4/1968 | Mowell et al. |
| 3,531,264 A | 9/1970 | Greipel |
| 3,543,377 A | 12/1970 | Bremner |
| 3,559,408 A | 2/1971 | Earnhart |
| 3,672,103 A | 6/1972 | Kost |
| 3,688,801 A | 9/1972 | Rohrer |
| 3,721,270 A | 3/1973 | Wittgenstein |
| 3,799,440 A | 3/1974 | Goss et al. |
| 3,841,671 A | 10/1974 | Walker |
| 3,974,862 A | 8/1976 | Fuhrmann |
| 3,980,112 A | 9/1976 | Basham |
| 3,995,472 A | 12/1976 | Murray |
| 4,009,739 A | 3/1977 | Weatherford |
| 4,010,581 A | 3/1977 | Keturi et al. |
| 4,020,641 A | 5/1977 | Takada |
| 4,062,376 A | 12/1977 | McGrath |
| 4,094,536 A | 6/1978 | Cole et al. |
| 4,110,947 A | 9/1978 | Murray et al. |
| 4,127,286 A | 11/1978 | Albertsen |
| 4,132,083 A | 1/1979 | McGrath |
| 4,149,568 A | 4/1979 | Kuntz et al. |
| 4,159,027 A | 6/1979 | Caillet |
| 4,274,549 A | 6/1981 | Germain |
| 4,309,128 A | 1/1982 | Williams |
| 4,315,408 A | 2/1982 | Karl |
| 4,318,835 A | 3/1982 | Clarke |
| 4,411,290 A | 10/1983 | Heath |
| 4,449,853 A | 5/1984 | Mennella et al. |
| 4,457,349 A | 7/1984 | Vazin |
| 4,519,634 A | 5/1985 | Hand |
| 4,561,292 A | 12/1985 | Pugnale et al. |
| 4,565,351 A | 1/1986 | Conti et al. |
| 4,612,744 A | 9/1986 | Shamash |
| 4,619,555 A | 10/1986 | Skinner et al. |
| 4,639,164 A | 1/1987 | Pugnale et al. |
| 4,643,460 A | 2/1987 | Lieberg |
| 4,644,780 A | 2/1987 | Jeter |
| 4,667,505 A | 5/1987 | Sharp |
| 4,678,370 A | 7/1987 | Allen |
| 4,682,911 A | 7/1987 | Moreland |
| 4,685,831 A | 8/1987 | Mahoney |
| 4,702,645 A | 10/1987 | Skinner et al. |
| 4,739,648 A | 4/1988 | Horner |
| 4,770,562 A | 9/1988 | Muller et al. |
| 4,778,310 A | 10/1988 | Moreland |
| 4,787,772 A | 11/1988 | Wagner |
| 4,796,669 A | 1/1989 | Onge |
| 4,796,676 A | 1/1989 | Hendershot et al. |
| 4,805,444 A | 2/1989 | Webb |
| 4,874,268 A | 10/1989 | Akesaka |
| 4,886,304 A | 12/1989 | Kunsman |
| 4,912,966 A | 4/1990 | Sharp |
| 4,932,257 A | 6/1990 | Webb |
| 4,971,477 A | 11/1990 | Webb et al. |
| 4,991,626 A | 2/1991 | Grantham |
| 5,005,613 A | 4/1991 | Stanley |
| 5,042,537 A | 8/1991 | Grantham |
| 5,098,221 A | 3/1992 | Osborne |
| 5,553,971 A | 9/1996 | Osborne |
| 5,567,083 A | 10/1996 | Osborne |
| 5,590,981 A | 1/1997 | Osborne |
| 6,116,817 A | 9/2000 | Osborne |

FOREIGN PATENT DOCUMENTS

| | | |
|---|---|---|
| JP | 51-003055 | 1/1976 |
| JP | 57-011800 | 1/1982 |
| JP | 57-146126 | 9/1982 |
| JP | 62-23000 | 2/1987 |
| JP | SHO 62-23000 | 2/1987 |
| JP | 62-200630 | 12/1987 |
| WO | 90/04157 | 4/1990 |

OTHER PUBLICATIONS

Literature entitled "ke Rohrsysteme und Umweltterchnik, FLEXWELL®—Saugleitung im Tankstellenbau," (3 pages) in German (Oct. 1987).

Product Information for Piping Sumps, by Owens–Corning Fiberglas Corp., Pub. No. 3–PE–13703 and 3–PE–13704, various sheets (6 pages) (Dec. 1985).

"Catalog for Concrete Professionals," by Concraft Supply, Inc., 7823 Loisdale Rd., Springfield, VA, 22150; 4 pages.

Information Disclosure Statement, U.S. Appl. No. 09/085,747; 3 pages (Feb. 19, 1999).

Information Disclosure Statement, U.S. Appl. No. 09/084,747; 4 pages (May 19, 1999).

Information Disclosure Statement, U.S. Appl. No. 09/084,747; 4 pages (Oct. 12, 1999).

US 5,590,981 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 4 are cancelled.

Claims 1 and 5-8 are determined to be patentable as amended.

Claim 3, dependent on an amended claim, is determined to be patentable.

New claims 9-24 are added and determined to be patentable.

1. A secondarily contained piping system comprising:
  (a) a flexible inner supply pipe;
  (b) an outer secondary containment pipe;
  (c) a first underground access chamber;
  (d) a second underground access chamber spaced from the first underground access chamber;
  (e) said flexible inner supply pipe positioned to provide a path of fluid communication between said first underground access chamber and said second underground access chamber;
  (f) said flexible inner supply pipe having an exterior surface;
  (g) said flexible inner supply pipe further having a first end and a second end;
  (h) said secondary containment pipe surrounding at least a portion of the exterior surface of said inner supply pipe;
  (i) a fluid source connected at the first end of the flexible inner supply pipe;
  (j) a fluid outlet connected at the second end of the flexible inner supply pipe;
  (k) a first coupling connecting the flexible inner supply pipe to the fluid source, the first coupling being disposed within the first underground access chamber; and
  (l) a second coupling connecting the flexible inner supply pipe to the fluid outlet, the second coupling being disposed within the second underground access chamber, *wherein the flexible inner supply pipe is segmented and wherein the piping system further comprises:*
    *a plurality of intermediate couplings connecting segmented portions of the flexible inner supply pipe; and*
    *additional underground access chambers, as necessary, each of said intermediate couplings being disposed within one of the underground access chambers.*

5. The secondarily contained piping system as defined in [4] *claim 1* further comprising a plurality of intermediate fittings, each intermediate fitting being disposed within one of the underground access chambers.

6. The secondarily contained [fuel] *fluid* distribution system as defined in claim [2] *7* further comprising:

a first fitting associated with the first coupling, the first fitting being disposed within the first access chamber; and
  a second fitting associated with the second coupling, the second fitting being disposed within the second access chamber.

7. [The] *A* secondarily contained [fuel] *fluid* distribution system [as defined in claim 2] *for supplying fuel to at least one fuel dispenser comprising:*
  (a) *a fuel dispensing unit;*
  (b) *a flexible inner fuel supply pipe;*
  (c) *an underground outer secondary containment pipe;*
  (d) *first and second access chambers, said second access chamber being associated with said fuel dispensing unit, said first access chamber being spaced from the second access chamber;*
  (e) *said flexible inner fuel supply pipe positioned to provide a path of fluid communication between said first and said second access chambers;*
  (f) *said flexible inner fuel supply pipe having an exterior surface;*
  (g) *said flexible inner fuel supply pipe further having a first end and a second end;*
  (h) *said secondary containment pipe surrounding at least a portion of the exterior surface of said inner supply pipe;*
  (i) *a fuel source connector at the first end of the flexible inner fuel supply pipe;*
  (j) *a fluid outlet at the second end of the flexible inner fuel supply pipe which is connected to said fuel dispensing unit;*
  (k) *a first coupling connecting the flexible inner fuel supply pipe to the fuel source connector, the first coupling being disposed within the first spaced access chamber; and*
  (l) *a second coupling connecting the flexible inner fuel supply pipe to the fluid outlet, the second coupling being disposed within the second spaced access chamber* wherein the flexible inner fuel supply pipe is segmented and wherein the [fuel] *fluid* distribution system further comprises:
    a plurality of intermediate couplings connecting segmented portions of the flexible inner fuel supply pipe; and
    additional access chambers, as necessary, each of said intermediate couplings being disposed within one of the access chambers.

8. The secondarily contained [fuel] *fluid* distribution system as defined in claim 7 further comprising a plurality of intermediate fittings, each intermediate fitting being disposed within one of the access chambers.

*9. The secondarily contained piping system as defined in claim 1 wherein said fluid source comprises an underground pump positioned in said first access chamber.*

*10. The secondarily contained piping system as defined in claim 1 wherein the secondary containment pipe is fluidly isolated from said access chambers.*

*11. The secondarily contained piping system as defined in claim 1 wherein said second access chamber is configured to contain fluid leaked from said inner supply pipe without contaminating the surrounding environment.*

*12. The secondarily contained piping system as defined in claim 1 wherein said secondary containment pipe includes an end positioned adjacent to at least one of said access* chambers, wherein said end is positioned lower relative to other portions of said secondary containment pipe thereof to enable gravity draining therethrough into said one of said access chambers.

13. The secondarily contained piping system as defined in claim 1 wherein at least one of said couplings is positioned within said secondary containment pipe.

14. The secondarily contained piping system as defined in claim 1 wherein said first coupling is positioned within said secondary containment pipe.

15. The secondarily contained piping system as defined in claim 1 wherein each of said intermediate couplings of said piping system are disposed within one of the underground access chambers.

16. A secondarily contained fluid distribution system for supplying fuel to at least one fuel dispenser comprising:
   (a) a fuel dispensing unit;
   (b) a flexible inner fuel supply pipe;
   (c) an underground outer secondary containment pipe;
   (d) first and second access chambers, said second access chamber being associated with said fuel dispensing unit, said first access chamber being spaced from the second access chamber;
   (e) said flexible inner fuel supply pipe positioned to provide a path of fluid communication between said first and said second access chambers;
   (f) said flexible inner fuel supply pipe having an exterior surface;
   (g) said flexible inner fuel supply pipe further having a first end and a second end;
   (h) said secondary containment pipe surrounding at least a portion of the exterior surface of said inner supply pipe;
   (i) a fuel source connector at the first end of the flexible inner fuel supply pipe;
   (j) a fluid outlet at the second end of the flexible inner fuel supply pipe which is connected to said fuel dispensing unit;
   (k) a first coupling connecting the flexible inner fuel supply pipe to the fuel source connector, the first coupling being disposed within the first spaced access chamber; and
   (l) a second coupling connecting the flexible inner fuel supply pipe to the fluid outlet, the second coupling being disposed within the second spaced access chamber, and wherein said inner supply pipe includes a plurality of segments, each segment being fluidly coupled to an adjacent segment by an intermediate coupling, and wherein the system further includes a plurality of intermediate underground chambers, each intermediate coupling being positioned in one of said intermediate underground chambers.

17. The secondarily contained fluid distribution system as defined in claim 7 wherein said first coupling is positioned within said secondary containment pipe.

18. The secondarily contained fluid distribution system as defined in claim 7 wherein at least one of said access chambers is configured to contain fuel leaked from said inner fuel supply pipe without contaminating the surrounding environment.

19. A secondarily contained piping system comprising:
   (a) a flexible inner supply pipe;
   (b) an outer secondary containment pipe;
   (c) a first underground access chamber;
   (d) a second underground access chamber spaced from the first underground access chamber;
   (e) said flexible inner supply pipe positioned to provide a path of fluid communication between said first underground access chamber and said second underground access chamber;
   (f) said flexible inner supply pipe having an exterior surface;
   (g) said flexible inner supply pipe further having a first end and a second end;
   (h) said secondary containment pipe surrounding at least a portion of the exterior surface of said inner supply pipe;
   (i) a fluid source connected at the first end of the flexible inner supply pipe;
   (j) a fluid outlet connected at the second end of the flexible inner supply pipe;
   (k) a first coupling connecting the flexible inner supply pipe to the fluid source, the first coupling being disposed within the first underground access chamber; and
   (l) a second coupling connecting the flexible inner supply pipe to the fluid outlet, the second coupling being disposed within the second underground access chamber, wherein at least one of said access chamber is configured to contain fluid leaked from said inner fuel supply pipe without contaminating the surrounding environment.

20. The secondarily contained piping system as defined in claim 19 wherein said second access chamber is configured to contain fluid leaked from said inner fuel supply pipe without contaminating the surrounding environment.

21. The secondarily contained piping system as defined in claim 18 wherein said secondary containment pipe includes an end positioned adjacent to at least one of said access chambers, wherein said end is positioned lower relative to other portions of said secondary containment pipe thereof to enable gravity draining therethrough into said one of said access chambers.

22. The secondarily contained piping system as defined in claim 19 wherein said fluid source includes an underground pump positioned in said first access chamber.

23. The secondarily contained piping system as defined in claim 19 wherein first access chamber includes a manway providing access therein for a worker from grade level and said access chamber is sized to receive a worker therein.

24. The secondarily contained piping system as defined in claim 19 wherein both of said access chambers are configured to contain fluid leaked from said inner fuel supply pipe without contaminating the surrounding environment.

* * * * *